(No Model.) 4 Sheets—Sheet 2.

T. R. HOUSEMAN & C. B. M. SPROWLES.
APPARATUS FOR DESICCATING MATERIALS.

No. 386,781. Patented July 24, 1888.

(No Model.) 4 Sheets—Sheet 3.
T. R. HOUSEMAN & C. B. M. SPROWLES.
APPARATUS FOR DESICCATING MATERIALS.
No. 386,781. Patented July 24, 1888.
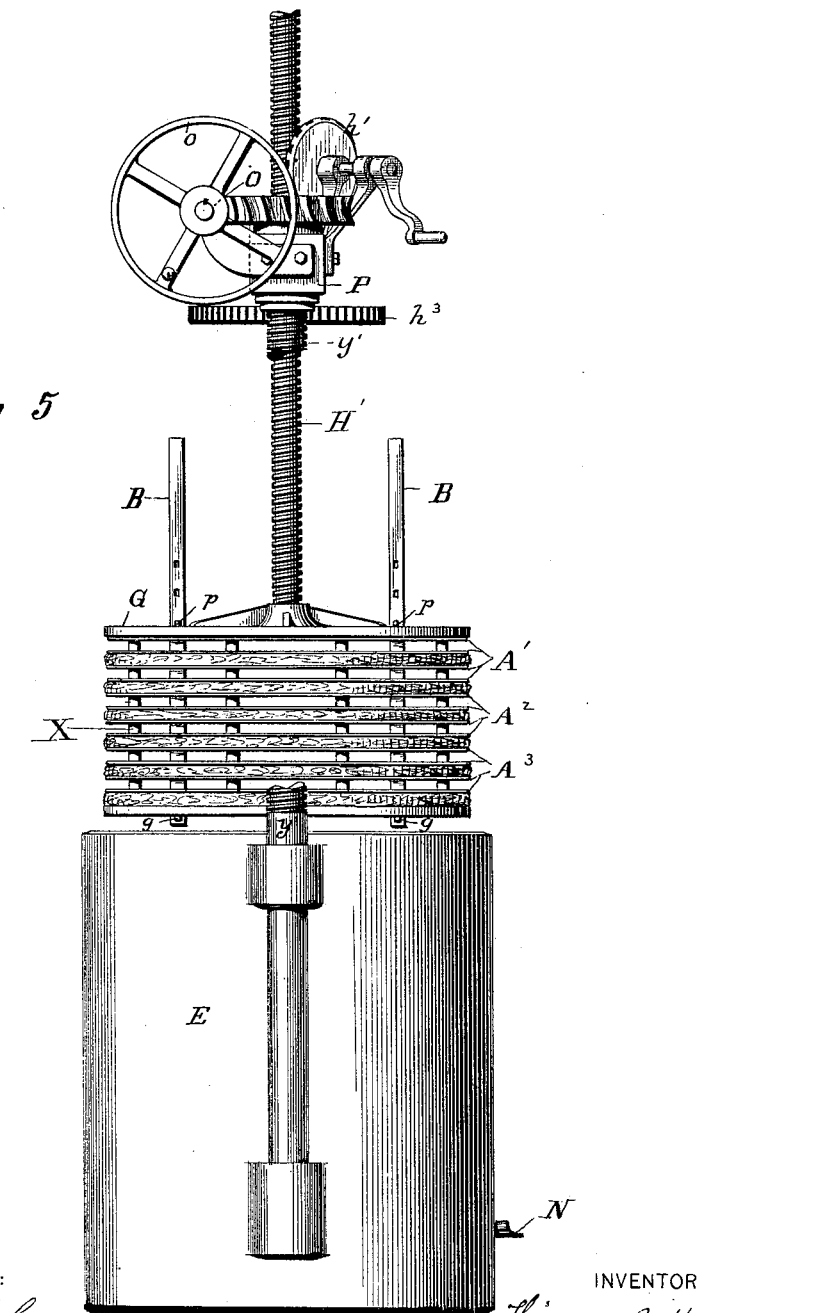

(No Model.) 4 Sheets—Sheet 4.

T. R. HOUSEMAN & C. B. M. SPROWLES.
APPARATUS FOR DESICCATING MATERIALS.

No. 386,781. Patented July 24, 1888.

WITNESSES: INVENTOR,

UNITED STATES PATENT OFFICE.

THOMAS R. HOUSEMAN AND CHRISTIAN B. M. SPROWLES, OF PHILADELPHIA, PENNSYLVANIA, ASSIGNORS TO THE UNITED STATES FOOD FERTILIZER AND MANUFACTURING COMPANY, OF PENNSYLVANIA.

APPARATUS FOR DESICCATING MATERIALS.

SPECIFICATION forming part of Letters Patent No. 386,781, dated July 24, 1888.

Application filed September 23, 1887. Serial No. 250,468. (No model.)

*To all whom it may concern:*

Be it known that we, THOMAS R. HOUSEMAN and CHRISTIAN B. M. SPROWLES, of the city and county of Philadelphia, State of Pennsylvania, have invented a new and useful Improvement in Apparatus for the Desiccation of Materials, of which the following is a true and exact description, due reference being had to the drawings, which accompany and form a part of this specification, and in which similar letters denote similar parts.

The object of our invention is to provide a machine which will deprive any substance of its liquid, leaving it in a dry state for future use. As is well known, there are many substances, such as brewers' grains, which are so charged with liquid that they ferment and become spoiled, yet if that liquid be removed such waste product becomes of great value. Many methods and apparatus have been devised to accomplish this result without approaching any certain success. Heretofore the apparatus for accomplishing this result has been either such as to produce it entirely by the exertion of pressure or use of heat alone, and if heat and pressure were combined the heat was that produced by steam entering the mass itself, which is the use of moist heat.

The object of our improved mechanism is to produce the result of desiccation by the use of pressure upon and a dry heat throughout the mass, the process of accomplishing which forms the subject-matter of another application, for which we are about to apply for Letters Patent.

Figure 1:
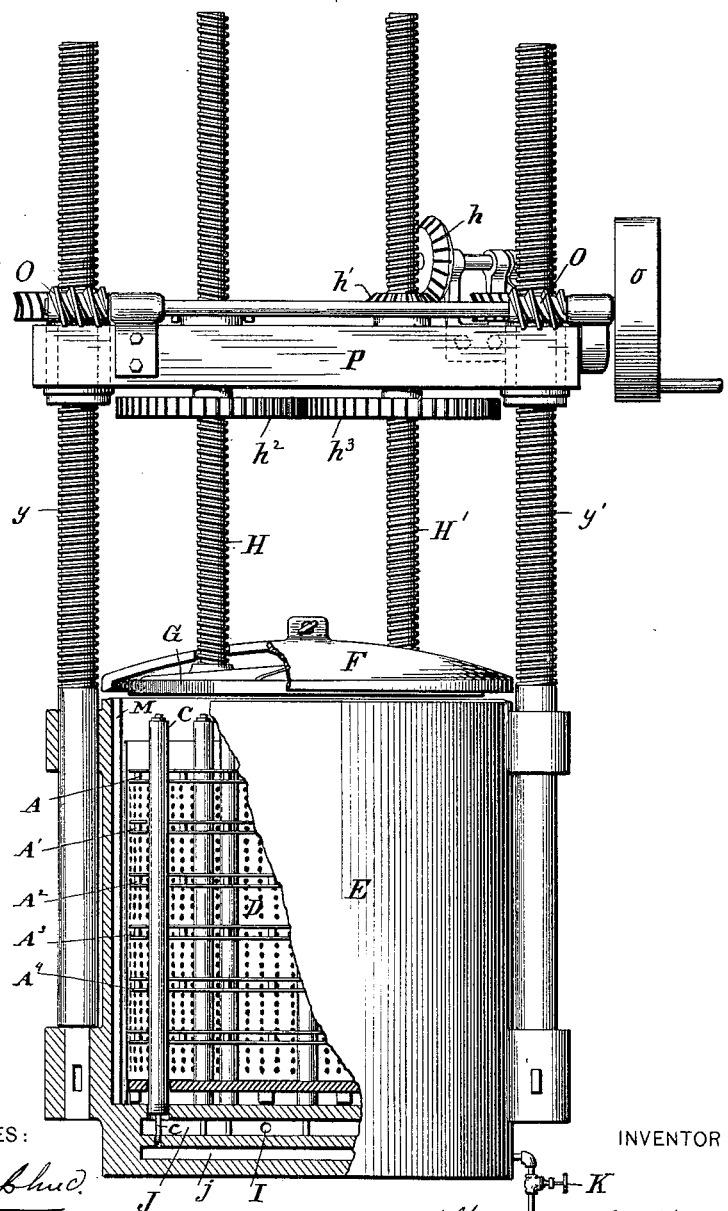
Figure 2:
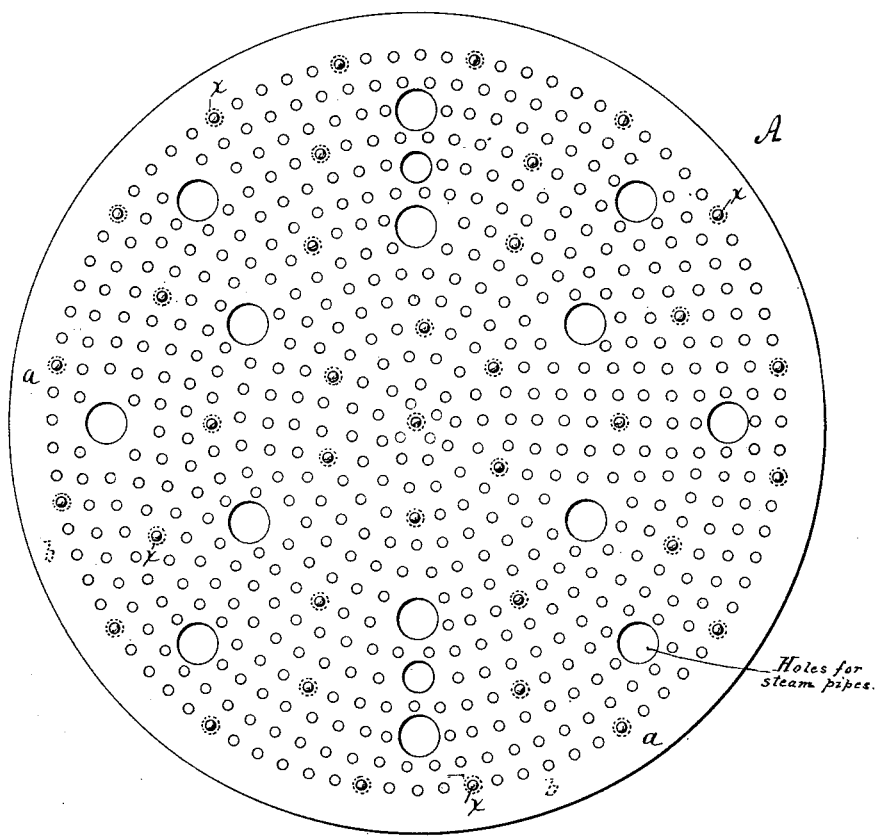
Figure 3:
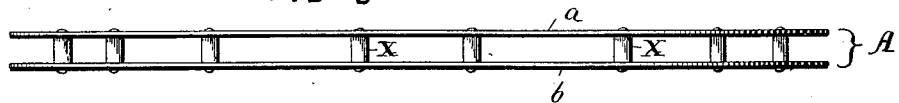
Figure 4:
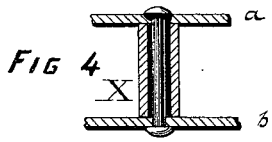
Figure 7:
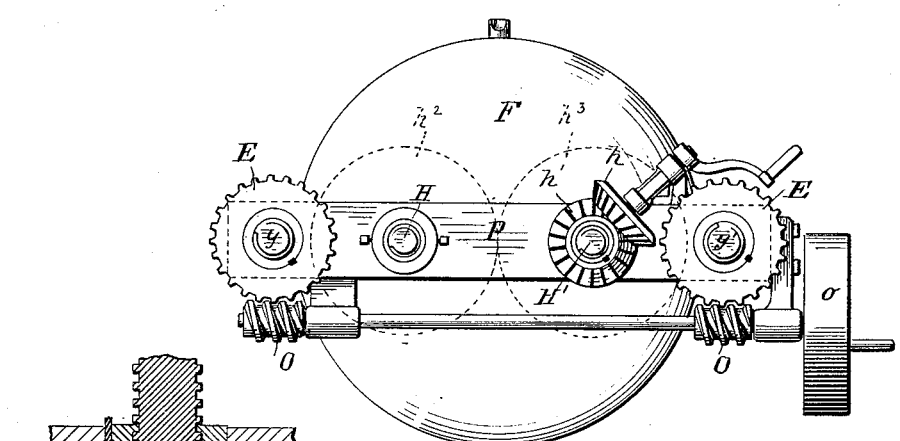
Figure 8:
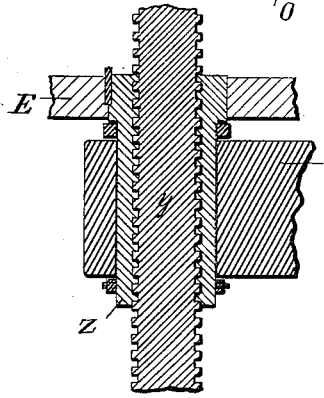
Figure 9:
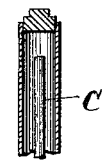
Figure 6:
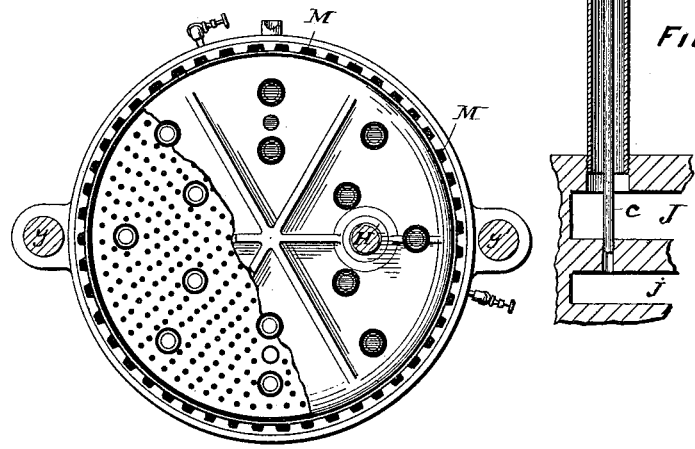

In the drawings, Figure 1 represents a view of the entire apparatus, with a portion of the outer cylinder and a portion of the inner perforated cylinder removed. Fig. 2 represents a plan view of the receptacles in which the material to be desiccated is placed. Fig. 3 represents a view of double disks with supports and divisions X. Fig. 4 represents the supports and divisions between the upper and lower surfaces of the receptacles shown at X, Fig. 3. Fig. 5 represents a view of the machine, showing the receptacles withdrawn. Fig. 6 represents a plan view of the top of the apparatus below the mechanism for causing compression. Fig. 7 represents a plan view of the top of the entire apparatus, showing the gearing for operating the compressing mechanism and withdrawing the receptacles from the cylinders. Fig. 8 represents a section of the screws and cross-beam shown in Fig. 1, left-hand side. Fig. 9 is a detail view of the steam-pipe, showing the means for removing the condensed steam.

$A'$ $A^2$ $A^3$, Fig. 5, are a series of perforated disks joined together in pairs ($a$ and $b$, Fig. 3) by means of the supports and divisions X. These disks are shown in plan view, Fig. 2, and have orifices in them through which the upright supports or guides B pass, Fig. 5, and upon which supports or guides these receptacles are strung. The material to be desiccated is placed upon these disks, one at a time, adding disk after disk, until, if desired, disks are used sufficient to cause a height equal to the capacity of the shell E, when the disks are lowered, by mechanism to be hereinafter described, into the cylindrical shell E. Within this shell E is a perforated cylindrical shell, D, and between this inner and outer shell is a series of vertical channels, M M, for the purpose of carrying off the liquid. A series of pipes, C, projects upward in the interior of the apparatus through the perforated disks. These pipes terminate at their lower ends in the steam-chamber J, Fig. 1. The steam or hot air enters this chamber through the orifice I and travels up through the pipes C, heating the material to be desiccated with a dry heat throughout. If steam be the heating agent used, I construct the pipe C as shown in Fig. 9, where, within the tube C, is a smaller tube, $c$, extending to the desired height and open at the top. The condensed steam falls into this small tube, and returning through it falls into the condensing-steam chamber $j$, from which it is drawn off by the cock K. A removable cover, F, rests on the top of the cylinder E, and through which the screws H H' pass at the end of these screws in the piston G, which rests up in the uppermost receptacles A. The guide B passes also through this piston G. The guide is locked with the lowermost receptacle by a pin, $g$, passed through an orifice in the guide B. The guide B may also be connected with the piston G by the pins *p*, placed in orifices in the guide B, by which means, when the piston is elevated, as will hereinafter be described, the receptacles are carried up with it out of the cylinder.

The receptacles being in the cylinder, as hereinbefore described, the piston G is caused to be forced upon the receptacles, compressing the disks and the material on them and depriving the material of its liquid. The piston is operated by means of the bevel-gear $h$ $h'$ and spur-wheels $h^2$ $h^3$, thereby forcing the piston down and compressing the material to be desiccated, and the liquid is forced up and down and falls between the upper and lower surfaces of the disks, whence it is carried by the vertical channels M M, (shown in Figs. 6 and 1,) formed upon the inner periphery of the outer casing, E, of the apparatus and runs out by the spout N, Fig. 5. When the bevel-gear heretofore described is not of sufficient power to cause the required amount of compression, I add the worm-gearing O O, (shown in Fig. 1,) operated by the wheel *o*. A beam, P, connects these two worm-gearings, and through this beam the screws H H' pass and fit so as to travel up without lifting the beam. The hubs Z Z' of the worm-gearing O pass through the respective outer ends of this beam, and it is internally threaded, through which the screws *y y'* pass, as shown in Fig. 8, and when the worm-gearing is operated the beam is elevated or depressed, carrying with it the screws H H' and the piston G, and thereby a more powerful compression may be obtained.

When the compression has been carried on to the extent, aided by the heat, necessary to deprive the material entirely of its liquid, the bevel-gear is reversed and the screws H H' elevated, carrying with them the plunger G. If, as has been heretofore described, the guide B be connected with the piston G, then the receptacles are drawn out of the cylinders E, and the desiccated material may be readily removed, the cover F having been removed prior to the elevation of the piston.

We do not intend to limit ourselves to the form of double-disk receptacles described, as, if desired, a series of single disks may be used.

Having now fully described our invention, what we claim, and desire to protect by Letters Patent, is—

1. In combination, perforated disks, a series of pipes passing through said disks, into which heat is carried, a piston, and mechanism to operate said piston, substantially as described, so as to compress any material upon said disks and desiccate it, and means to carry off said liquid.

2. In combination, perforated disks, a series of pipes passing through said disks, in which heat is carried and radiated through the mass, a perforated cylinder surrounding said disks, a cylinder surrounding said perforated cylinder, provided with channels, a piston, and mechanism to operate said piston, substantially as described, so as to compress any material upon said disks and desiccate it, substantially as and for the purpose specified.

3. In combination, double perforated disks having supports and divisions between the upper and lower portions thereof, guide or guides upon which said disks are strung, a piston, and mechanism to operate said piston, substantially as described, so as to compress any material upon said disks and desiccate it, substantially as and for the purpose specified.

4. In combination, double perforated disks having supports and divisions between the upper and lower portions thereof, guide or guides upon which said disks are strung, a perforated cylinder having one or more channels surrounding said disks, a cylinder surrounding said perforated cylinder, a piston, and mechanism to operate said piston, substantially as described, so as to compress any material upon said disks and desiccate it, substantially as and for the purpose specified.

5. In combination, double perforated disks, supports and divisions between the upper and lower portions thereof, guide or guides upon which said disks are strung, a series of pipes passing up through said disks in which heat is conveyed, a perforated cylinder surrounding said disks, a cylinder surrounding said perforated cylinder having one or more channels, a piston, and mechanism to operate said piston, substantially as described, so as to compress any material upon said receptacles.

6. In combination, perforated disks, a series of pipes, C, passing through said disks, a pipe, *c*, in each of said pipes, an inlet for steam into said pipes C, and an outlet from said pipes *c* for condensed steam, a piston, and mechanism to operate said piston, substantially as described, so as to compress any material upon said disks and desiccate it.

7. In combination, perforated disks, a series of pipes passing through said perforated disks in which heat is carried, a piston, screws H H', bevel-gear $h$ $h'$, spur-wheels $h^2$ $h^3$, whereby said piston compresses any material upon said disks and desiccates it.

8. In combination, perforated disks, a series of pipes passing through said disks through which heat is carried, a piston, screws H H', bevel-gear $h$ $h'$, spur-wheels $h^2$ $h^3$, beam P, worm-gearing O O, internally threaded, hubs Z Z', and screws *y y'*, whereby said piston compresses any material upon said disks and desiccates it.

9. In combination, a piston, perforated disks, and guides upon which said disks are strung, said guides provided with orifices, whereby the disks may be locked to the guides below the lowermost disk and above the piston.

10. In combination, a piston, perforated disks, guides upon which said disks are strung, said guides provided with orifices, whereby the disks may be locked to the guides below the lowermost disk and above the piston, and mechanism, substantially as described, to elevate said piston, whereby the disks may be elevated.

11. In combination, double perforated disks having divisions between the upper and lower portions thereof, guides upon which said disks are strung, a series of pipes passing up through said disks in which heat is carried, a piston, screws H H', bevel-gear $h\ h'$, and spur-wheels $h^2\ h^3$, whereby said piston compresses any material upon said disks and desiccates it.

12. In combination, double perforated disks having divisions between the upper and lower portions thereof, guide or guides upon which said disks are strung, a series of pipes passing up through said disks, a piston, screws H H', bevel-gear $h\ h'$ and spur-wheels $h^2\ h^3$, beam P, worm-gearing O O, internally threaded, hubs Z Z', and screws $y\ y'$, whereby said piston compresses any material upon said disks and desiccates it.

13. In combination, perforated disks, a series of pipes passing through said perforated disks in which heat is carried, a piston-beam, P, worm-gearing O O, internally threaded, hubs Z Z', and screws $y\ y'$.

THOMAS R. HOUSEMAN.
CHRISTIAN B. M. SPROWLES.

Witnesses:
JOHN SHALLCROSS,
HARRY G. THORNTON,
JAS. A. EDGAR.